(12) United States Patent
Parkinson

(10) Patent No.: US 7,752,194 B2
(45) Date of Patent: Jul. 6, 2010

(54) LDAP REVISION HISTORY

(75) Inventor: Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 328 days.

(21) Appl. No.: 11/809,008

(22) Filed: May 31, 2007

(65) Prior Publication Data

US 2008/0301097 A1   Dec. 4, 2008

(51) Int. Cl.
*G06F 7/00* (2006.01)
*G06F 17/30* (2006.01)
(52) U.S. Cl. ........................ 707/713; 707/736
(58) Field of Classification Search .............. 707/3, 707/100
See application file for complete search history.

(56) References Cited

U.S. PATENT DOCUMENTS

| 5,956,513 | A | * | 9/1999 | McLain, Jr. | 717/142 |
| 6,564,370 | B1 | * | 5/2003 | Hunt | 717/122 |
| 7,363,327 | B2 | * | 4/2008 | Bali et al. | 707/201 |
| 2001/0039588 | A1 | * | 11/2001 | Miyamoto | 709/229 |
| 2006/0123024 | A1 | * | 6/2006 | Sathyanarayan et al. | 707/100 |

* cited by examiner

*Primary Examiner*—Don Wong
*Assistant Examiner*—Angela M Lie
(74) *Attorney, Agent, or Firm*—Blakely, Sokoloff, Taylor & Zafman LLP

(57) ABSTRACT

A method and apparatus for maintaining a revision history in a Light Weight Directory Access Protocol (LDAP) repository. In one embodiment, the method includes receiving a query for a version of an attribute associated with an LDAP entry. The method further includes returning a value for the version of the attribute in response to the query.

16 Claims, 5 Drawing Sheets

QUERY PROCESSING

QUERY PROCESSING

UPDATE PROCESSING

LDAP REVISION HISTORY

TECHNICAL FIELD

Embodiments of the present invention relate to Lightweight Directory Access Protocol (LDAP), and more specifically, to maintaining a LDAP revision history in the LDAP repository.

BACKGROUND

Light Weight Directory Access Protocol (LDAP) has become very popular due to its efficient and fast data access. A large number of applications/services are currently being developed which use an LDAP directory as their centralized data repository.

In the LDAP directory, data is stored as entries including key/value pairs. A key/value pair may consist of an attribute name and an attribute value. For example, an entry representing a person may include the textual string "telephoneNumber" as the attribute name and the numeric string "+1 800 123 4567" as the attribute value.

Conventionally, the attribute values stored in the LDAP directory are their current values. Changes made to the LDAP entries are typically stored in a separate log file and cannot be easily retrieved. Thus, there is a need to develop an efficient mechanism for storing and retrieving the changes to an LDAP entry.

DESCRIPTION OF THE DRAWINGS

The present invention is illustrated by way of example, and not by way of limitation, in the figures of the accompanying drawings and in which.

DETAILED DESCRIPTION

Figure 1:
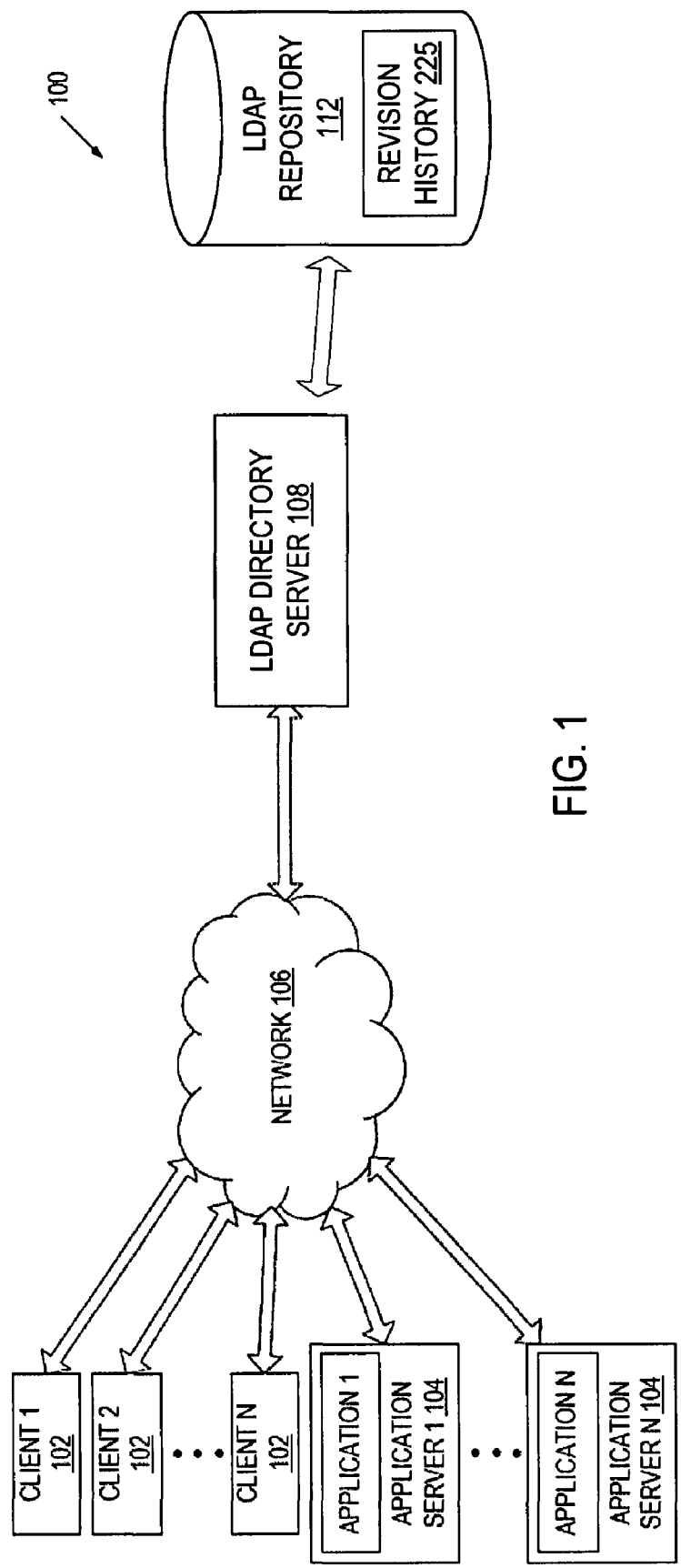
FIG. 1 illustrates a network architecture in which embodiments of the present invention may be implemented.

Described herein is a method and apparatus for providing a revision control in a Light Weight Directory Access Protocol (LDAP) repository. In one embodiment, an LDAP directory server stores a revision history for each LDAP entry. The revision history may be related, in particular, to one or more attributes of each LDAP entry. Storing the revision history for the attributes allows any changes (e.g., addition, deletion, or modification) to the attributes to be rolled back whenever necessary. Specific versions of an attribute may be queried. In response to a query specifying a version of an attribute associated with an LDAP entry, the LDAP directory server returns the corresponding attribute value for the version.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "updating", "maintaining", "determining", "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 illustrates an exemplary network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs), and the like.

The clients 102 are coupled to the LDAP directory server 108 via the network 106, which may be a public network (e.g., Internet) or a private network (e.g., Ethernet or a local area Network (LAN)). The LDAP directory server 108 may contain a server front-end responsible for network communications, plugins for server functions (such as access control and replication), a basic directory tree containing server-related data, and a database back-end plugin responsible for managing the storage and retrieval of LDAP repository data.

In one embodiment, the clients 102 communicate with the LDAP directory server 108 via a web server (not shown). For example, the clients 102 may host web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that host various applications requesting information from the LDAP directory server 108. The application servers 104 operate as clients in communication with the LDAP directory server 108. Similarly to the clients 102, the application servers 104 may communicate with the LDAP directory server 108 directly or via a web server.

The LDAP repository 112 may be part of the LDAP directory server 108, or it may reside externally (e.g., on a database server). The LDAP repository 112 may contain a tree of data entries, each of which includes an attribute name and an attribute value. The LDAP repository 112 may includes a revision history 225 of the attributes, which will be described in greater detail with reference to FIG. 2. Attributes may be further specialized through subtypes. For example, "language" and "title" may be subtypes of the attribute "common name." When performing a search of the LDAP repository 112, a query may specify the base attribute to retrieve data entries with all subtypes of this attribute or it may specify a certain subtype, in addition to the base attribute, to retrieve only data entries that match the specified subtype of the attribute. As another example, "version" may be a subtype of the attribute "telephoneNumber" in an LDAP entry for a person. In response to a query specifying a version of the telephone number, the LDAP directory server 108 retrieves the specific version of the person's telephone number from the LDAP repository 112. The query may alternatively include a wildcard in the subtype field (e.g., "telephoneNumber;*") to request the retrieval of all versions of the telephone number. The LDAP directory server 108 recognizes the field following the semicolon as a subtype field for the version according to a schema defining the syntax for the LDAP. In a scenario where a requestor does not know or does not care to know the current version number of the attribute value, the query may not include a version number. In this scenario, the LDAP directory server 108 retrieves only the current version of the person's telephone number from the LDAP repository 112.

Figure 2:
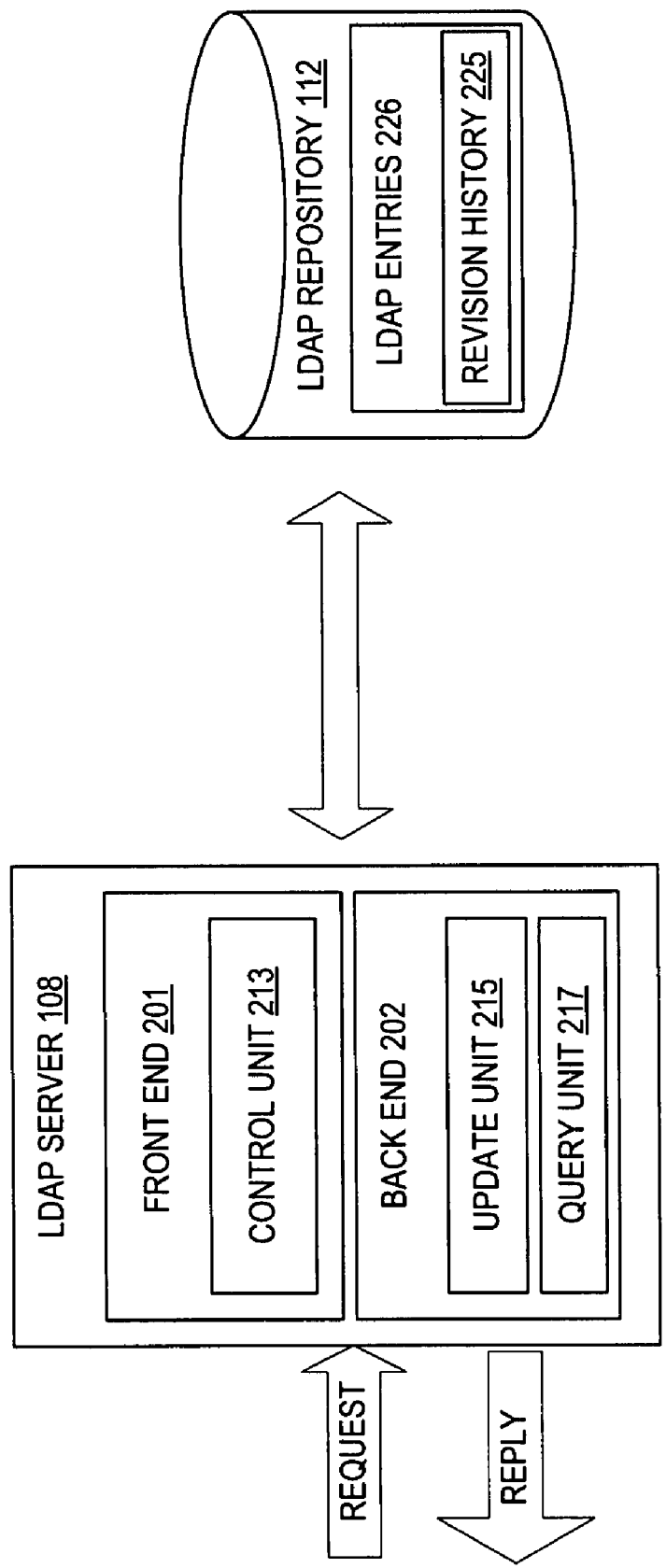
FIG. 2 is a block diagram of a Light Weight Directory Access Protocol (LDAP) directory server coupled to an LDAP repository.

FIG. 2 shows an embodiment of the LDAP directory server 108 and the LDAP repository 112. The LDAP directory server 108 includes a front end 201 and a back end 202. The front end 201 uses a control unit 213 to determine the type of request (e.g., a query or an update) and to identify the information to be retrieved if the request is a query. For example, when a query arrives at the front end 201, the control unit 213 parses the query to identify the attributes of an LDAP entry 226 to be retrieved from the LDAP repository 112. In parsing the query, the control unit 213 also identifies the versions of the attributes, if any, specified in the query. The query may specify the version of a requested attribute in a subtype field of the attribute. For example, the query may include "telephoneNumber; 2" to specify that the second version of the telephone number is requested. Alternatively, the query may specify the version of a requested attribute in a control message attached to the query. The control message is compliant with the LDAP protocol. In one embodiment, the control message includes a numeric string indicating the version of an attribute to be queried in the LDAP repository 112.

An example of a query using a control message to request a version of a telephone number is described below. Assume that an LDAP entry is described by:

dn: uid=jsmith, ou=engineering, o=red hat
cn: john smith
telephoneNumber: 123 456 7890
employeeStatus: employee
citizenship: united kingdom A query that requests the telephone number version 2 of John Smith may have the format as:

filter: (uid=jsmith)
base: o=red hat
attributes: telephoneNumber
+control: (version=2)

After the control unit 213 identifies the request type, the parsed information is passed to the back end 202. The back end 202 of the LDAP directory server 108 includes an update unit 215 to perform update operation to the LDAP entries 226, and a query unit 217 to perform query operations. The back end 202 is coupled to the front end 201 to receive the parsed information from the control unit 213 and to return retrieved values to the front end network interface for transmission to the requester. The back end 202 is also coupled to the LDAP repository 112 for accessing the LDAP entries 226. The revision history 225 is stored within the LDAP entries. In one embodiment, the revision history 225 is represented by attribute values associated with a version number. These attributed values and their version numbers are stored in corresponding LDAP entries 226. In one embodiment, versions are stored as subtypes of a specific attribute. For example, versions of the telephone number attribute may be expressed as follows:

telephoneNumber: (234) 567 8900
telephoneNumber;1: (202) 555 2822
telephoneNumber;2: (234) 567 8900

In the above example, the LDAP entries 226 include a version 1 and a version 2 of the telephone number. Additionally, the current telephone number, which is the telephone number version 2, may be stored as a separate item to allow speedy retrieval. In another embodiment, a revision history field is added to each LDAP entry that stores versions of all attribute values from the relevant LDAP entry.

Figure 3:
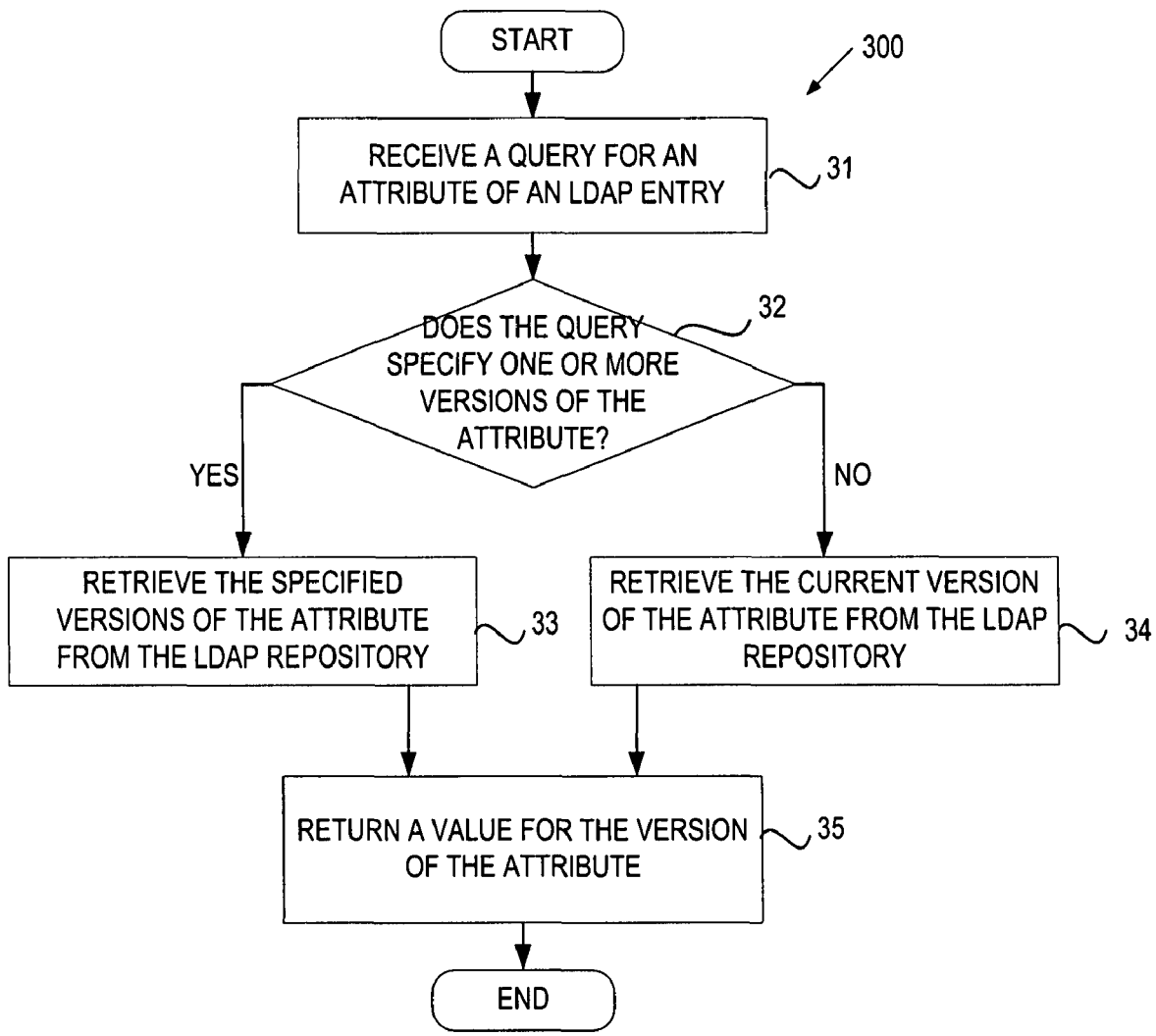
FIG. 3 is a flow diagram of one embodiment of a process that returns a version of an attribute value in response to a query.

FIG. 3 illustrates a flow diagram of one embodiment of a query process 300 for processing a query for a version of an attribute. The query process 300 may be performed by processing logic 526 of FIG. 5 that may comprise hardware (e.g., circuitry, dedicated logic, programmable logic, microcode, etc.), software (such as instructions run on a processing device), or a combination thereof. In one embodiment, the query process 300 is performed by the LDAP directory server 108 of FIG. 2.

Referring to FIG. 3, at block 31 the query process 300 begins with the processing logic 526 receiving a query for an attribute of an LDAP entry. In response to the request, at block 32, the processing logic 426 determines whether the query specifies a version of the requested attribute. As mentioned above, the version may be specified in the form of a subtype or in a control message. If one or more versions are specified, at block 33, the specified versions of the attribute value are retrieved from the LDAP repository 112. It is noted that the wildcard "*" may be deemed as specifying all versions of the attribute. If the query does not specify a version of the attribute, at block 34, only the current version of the attribute is retrieved. At block 35, the retrieved attribute value is returned to the requester in a reply message. For example, the reply message may be a control response, which has the same format as a control message, except that the control response includes the attribute value that is just retrieved.

Figure 4:
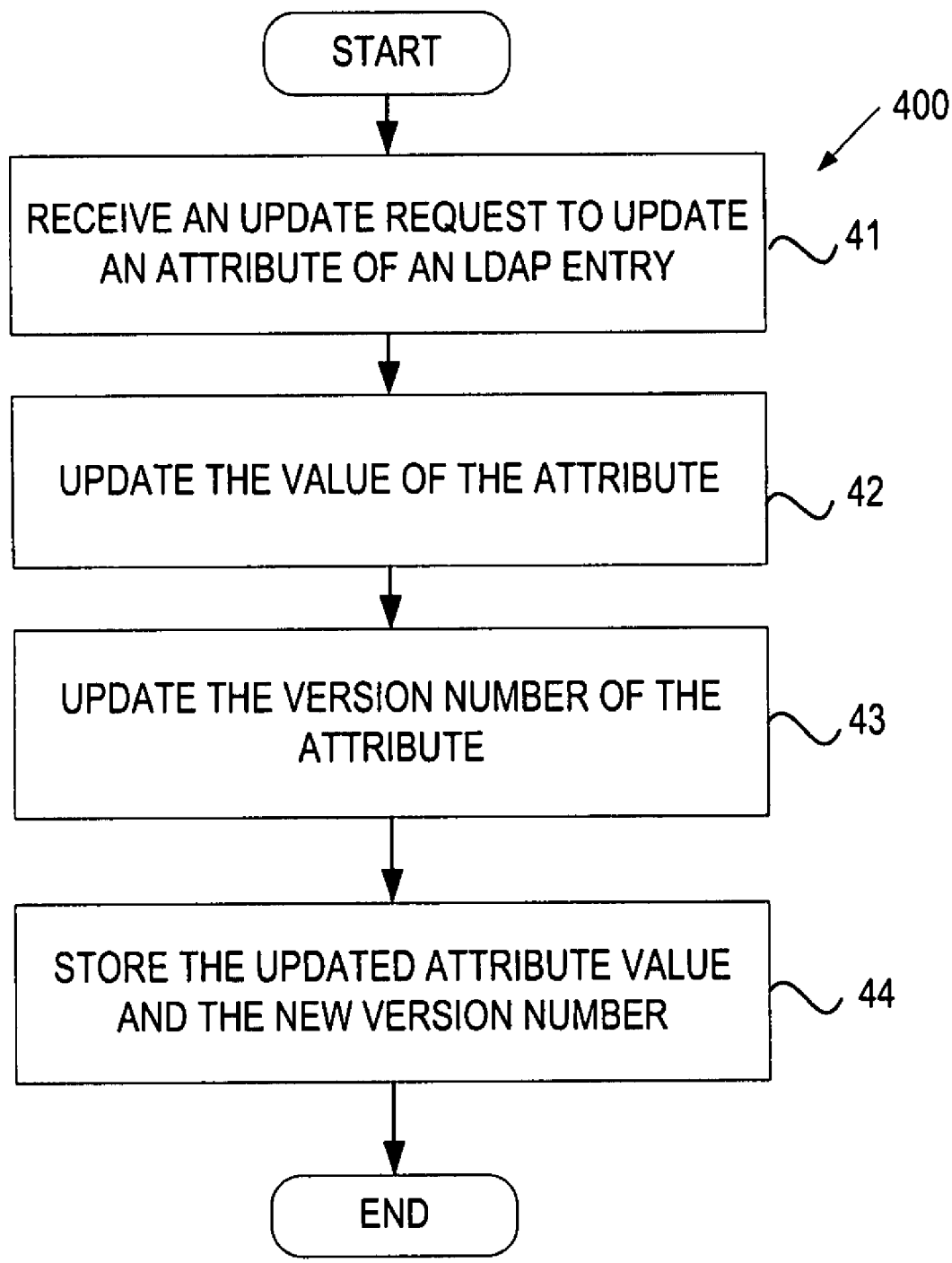
FIG. 4 is a flow diagram of one embodiment of an update process that updates an attribute value and the associated version number.

FIG. 4 illustrates a flow diagram of one embodiment of an update process 400 for updating an attribute value of an LDAP entry. The update process 400 may be performed by processing logic 526 of FIG. 5 that may comprise hardware (e.g., circuitry, dedicated logic, programmable logic, microcode, etc.), software (such as instructions run on a processing device), or a combination thereof. In one embodiment, the update process 400 is performed by the LDAP directory server 108 of FIG. 2.

Referring to FIG. 4, at block 41, the update process 400 begins with the processing logic 526 receiving an update request to update an attribute of an LDAP entry. For example, the update request may request adding a new attribute value, deleting an existing attribute value, modifying an attribute value, or rolling-back to a prior attribute value. In response to the request, at block 42, the processing logic 526 updates the attribute value of the LDAP entry. The update does not overwrite the existing attribute values, but merely stores the existing attribute values in LDAP entry fields designated for storing the revision history. The new attribute value is added to the LDAP entry and a new version number is assigned to the new attribute value. For example, if a new telephone number is added to an LDAP entry that already contains a telephone number version 1 and version 2, the new telephone number will be the telephone number version 3, which is the highest prior version number incremented by one in this example. In another scenario, the update request is a roll-back request, that is, the request indicates that a prior version of the attribute value should replace the current attribute value. At block 43, the version of the current attribute is updated. If the request is to add, delete or modify an attribute value, the version number is incremented. However, if the request is to roll-back to a prior value, the version number is reversed back to the prior version number. At block 44, the updated attribute value is stored with the new version number.

Figure 5:
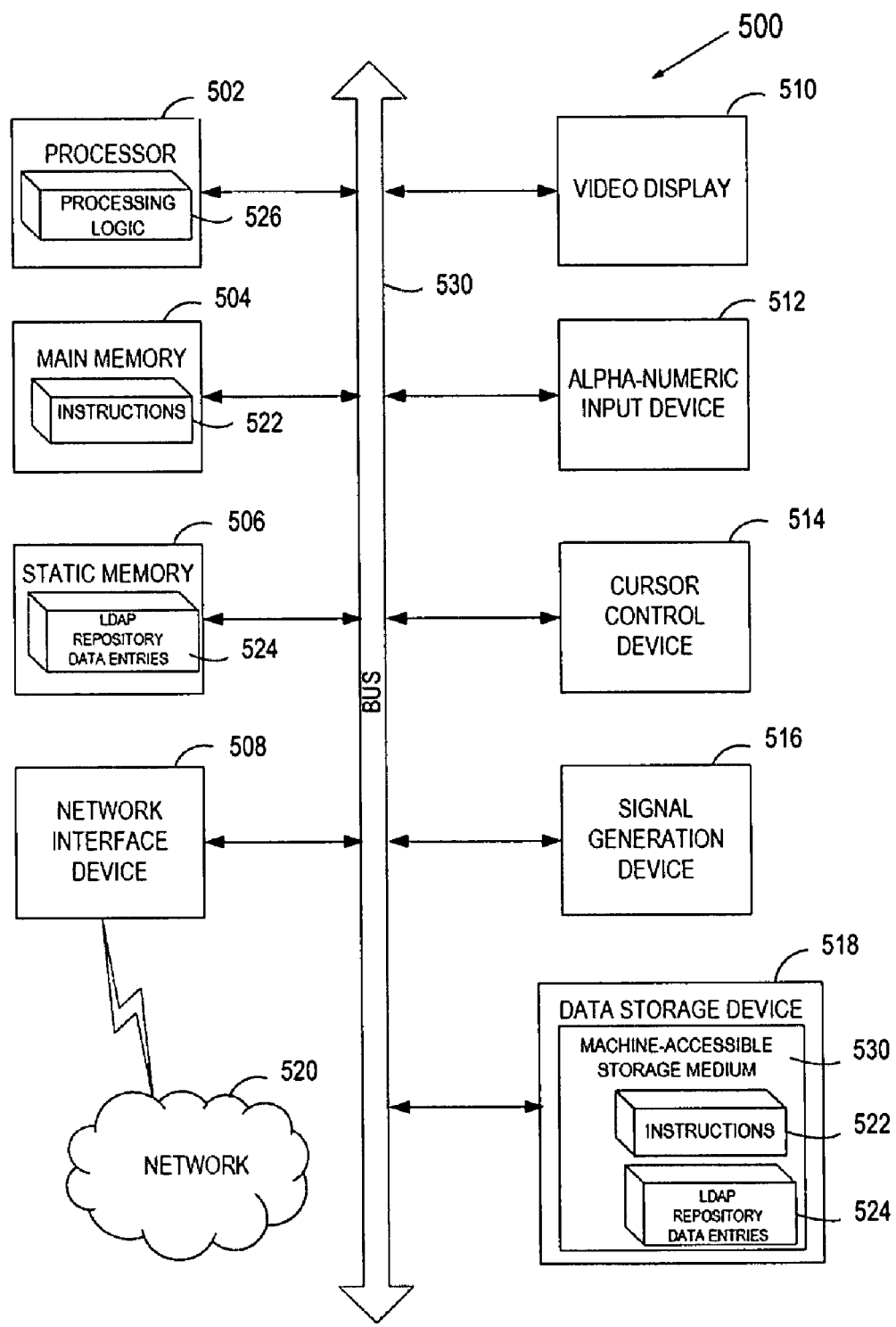
FIG. 5 illustrates a block diagram of an exemplary computer system implementing some embodiments of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store the LDAP repository data entries 524. The LDAP repository data entries 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for maintaining a revision history on an LDAP directory server have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   receiving, by a directory server, a query for an attribute associated with a Lightweight Directory Access Protocol (LDAP) entry, wherein the attribute is stored in a repository and contains a plurality of pairs of values, with each pair containing an attribute value and a corresponding version number stored as a subtype of the attribute;
   determining, by the directory server, whether the query includes a version number of the attribute;
   in response to a determination that the query includes a version number, returning a first attribute value that corresponds to the version number in the query;
   in response to a determination that the query includes a predetermined symbol, returning all versions of the attribute; and
   in response to a determination that the query does not include a version number or the predetermined symbol, returning a second attribute value that corresponds to a current version of the attribute.

2. The method of claim 1 further comprising:
   maintaining a revision history for changes made to the attribute associated with the LDAP entry in an LDAP repository.

3. The method of claim 1 wherein the query specifies the version in a subtype field of the attribute.

4. The method of claim 1 wherein the query specifies the version in a control message compliant with an LDAP protocol.

5. The method of claim 1 further comprising:
   updating a value of the attribute associated with the LDAP entry in response to an update request; and
   updating the version of the attribute associated with the LDAP entry.

6. A system comprising:
   a repository to store Lightweight Directory Access Protocol (LDAP) entries; and
   an LDAP server coupled to the repository to receive a query for an attribute associated with an LDAP entry, wherein the attribute is stored in the repository and contains a plurality of pairs of values, each pair containing an attribute value and a corresponding version number stored as a subtype of the attribute, the LDAP server to determine whether the query includes a version number of the attribute,
   in response to a determination that the query includes a version number, the LDAP server to return a first attribute value that corresponds to the version number in the query,
   in response to a determination that the query includes a predetermined symbol, returning all versions of the attribute, and
   in response to a determination that the query does not include a version number or the predetermined symbol, the LDAP server to return a second attribute value that corresponds to a current version of the attribute.

7. The system of claim 6 wherein the repository further comprises:
   one or more entry fields for a revision history to maintain changes made to the attribute of the LDAP entry.

8. The system of claim 6 wherein the LDAP server further comprises:
   a control unit to determine the version from a subtype field of the attribute in the query.

9. The system of claim 6 wherein the LDAP server further comprises:
   a control unit to determine the version from a control message compliant with an LDAP protocol.

10. The system of claim 6 wherein the LDAP server further comprises:
    one or more entry fields to store a plurality versions of the attribute in the LDAP entry.

11. The system of claim 6 wherein the LDAP server further comprises:
    an update unit to update a value of the attribute associated with the LDAP entry and to increment the version of the attribute associated with the LDAP entry.

12. An article of manufacture, comprising:
    a machine-accessible storage medium including data that, when accessed by a machine, cause the machine to perform a method comprising:
    receiving, by a directory server, a query for an attribute associated with a Lightweight Directory Access Protocol (LDAP) entry, wherein the attribute is stored in a repository and contains a plurality of pairs of values, with each pair containing an attribute value and a corresponding version number stored as a subtype of the attribute;
    determining whether the query includes a version number of the attribute;
    in response to a determination that the query includes a version number, returning a first attribute value that corresponds to the version number in the query;
    in response to a determination that the query includes a predetermined symbol, returning all versions of the attribute; and
    in response to a determination that the query does not include a version number or the predetermined symbol, returning a second attribute value that corresponds to a current version of the attribute.

13. The article of manufacture of claim 12 wherein the method further comprises:
    maintaining a revision history for changes made to the attribute associated with the LDAP entry in an LDAP repository.

14. The article of manufacture of claim 12 wherein the query specifies the version in a subtype field of the attribute.

15. The article of manufacture of claim 12 wherein the query specifies the version in a control message compliant with an LDAP protocol.

16. The article of manufacture of claim 12 wherein the method further comprises:
    updating a value of the attribute associated with the LDAP entry in response to an update request; and
    updating the version of the attribute associated with the LDAP entry.

* * * * *